United States Patent [19]

Edens

[11] 4,402,828

[45] Sep. 6, 1983

[54] PRESSURE FILTER VESSEL

[76] Inventor: Jeffrey I. Edens, 17649 Jacquelyn La., Huntington Beach, Calif. 92647

[21] Appl. No.: 387,795

[22] Filed: Jun. 14, 1982

[51] Int. Cl.³ .............................................. B01D 29/42
[52] U.S. Cl. .................................. 210/323.2; 210/443; 210/450; 210/456
[58] Field of Search ..................... 210/323.2, 345, 398, 210/443, 457, 450, 456

[56] References Cited

U.S. PATENT DOCUMENTS 3,339,735  9/1967  Kaster .............................. 210/323.2
4,120,794 10/1978  Taylor ............................. 210/450 X
4,319,997  3/1982  Pett ................................. 210/450 X Primary Examiner—John Adee
Attorney, Agent, or Firm—Boniard I. Brown

[57] ABSTRACT

A pressure filter vessel has a housing with an end cap at each end, a flow block in the lower end portion of the vessel having a reduced central portion and upper and lower flanges, a seal in each of the flanges for pressure sealing between the housing and each of the flanges, the flanges cooperating with the housing and the reduced central portion to define an annular chamber, and the upper flange cooperating with the housing and upper cap to define an upper chamber. An inlet connection to the flow block provides for fluid flow through a flow block opening to the upper chamber. At least one filter cartridge is mounted in an aperture in the flow block and extends to the upper chamber. The flow block defines a passage between the aperture and the annular chamber, and an outlet connection accommodates flow from the annular chamber. The wall of the reduced central portion of the flow block and the inner wall of the housing cooperate with the flanges to define the annular chamber. A first passage is preferably defined in the flow block for communication between the inlet connection and the upper chamber. The upper portion of the flow block preferably defines a plurality of apertures, and a plurality of passages are provided to communicate between the apertures and the annular chamber.

12 Claims, 9 Drawing Figures

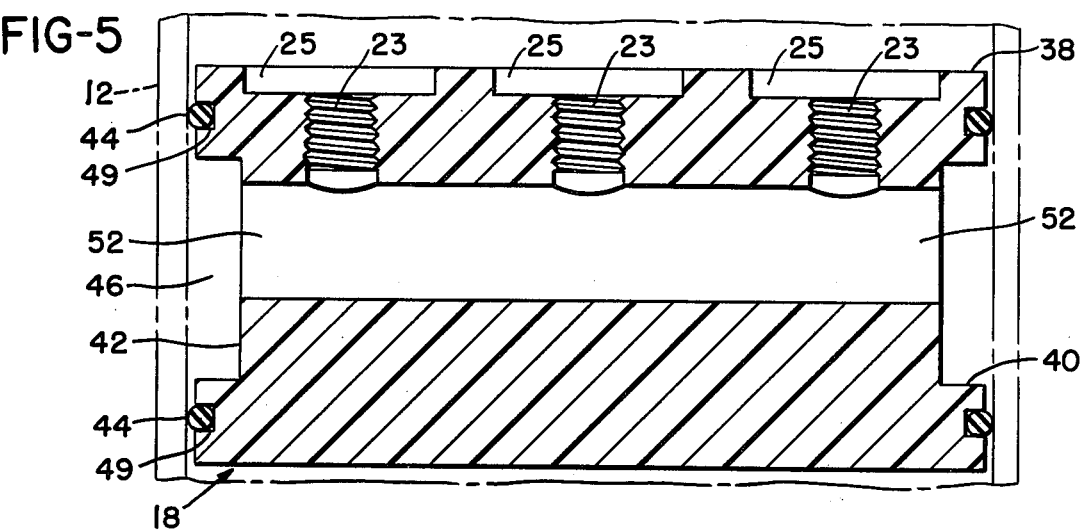
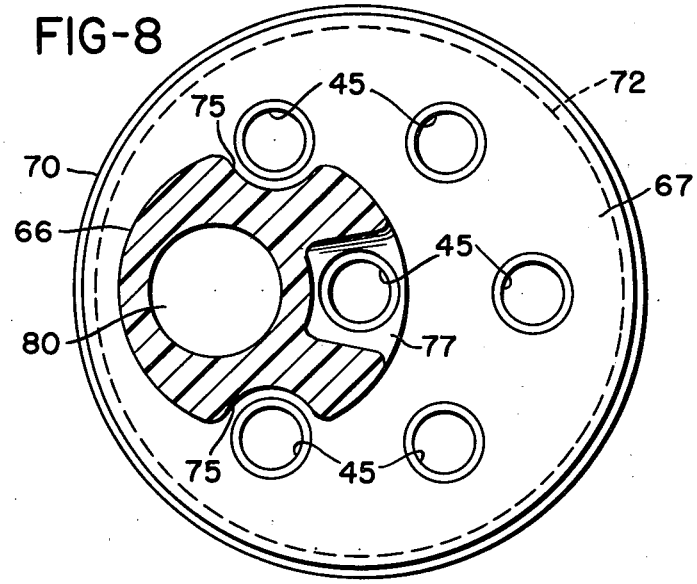
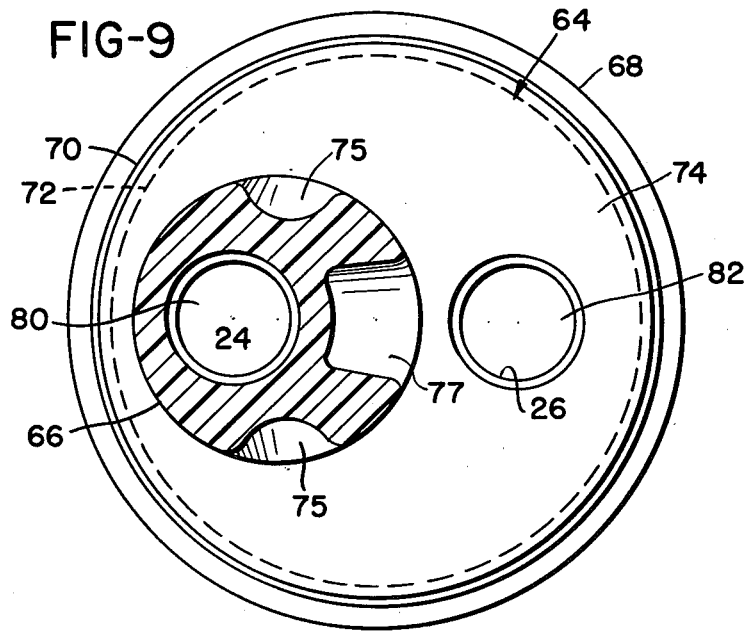

PRESSURE FILTER VESSEL

BACKGROUND OF THE INVENTION

The prior art filter apparatus constructed of plastics and having inlet and outlet connections either in the sides of the filter apparatus or in the ends of these structures, tend to deform or burst apart and cause leakage when subjected to high pressures of the order of say 100 psi. Such a filter structure tends to lose any safety factor which had been provided and would become hazardous. Thus, for example, the prior art filters of plastic construction can only stand about 100–150 psi maximum, when larger diameter filter vessels are employed. This type of filter vessel is generally made of plastics, since steel or other alloys corrode in water, acids, bases and other chemicals.

While a filter vessel can be made of plastic with round or dome heads that will take high pressure, there is the problem of putting inlet and outlet connections on this vessel of a size large enough to handle the fluid volumes and keep them from bursting and leaking at high pressure.

Illustrative of the prior art are the filter apparatus of U.S. Pat. Nos. 3,696,933 and 3,186,148.

It is an object of the present invention to provide a filter apparatus which will withstand high pressures, and at the same time have a high safety factor. Another object is the provision of a high pressure fluid or gas filter having a unique filter block structure.

SUMMARY OF THE INVENTION

In accordance with the present invention, there is provided a pressure filter vessel comprising a cylindrical housing, an end cap on each end of the housing, a flow block having a reduced central portion and upper and lower flanges, the block being in the lower portion of the vessel, with seals on each of the flanges for fluid pressure sealing between the housing and each flange, the flanges cooperating with the housing and the flow block reduced portion to define an annular chamber. The upper flange cooperates with the housing and upper end cap to define an upper chamber. An inlet connection to the flow block provides fluid flow through a flow block opening to the upper chamber. Filter cartridges are mounted in apertures in the upper portion of the flow block and extend into the upper chamber. The flow block has passages communicating between the apertures and the annular chamber, and an outlet connection to provide fluid flow from the annular chamber.

The end caps and annular separation chamber and flow block can be formed of materials such as metals or plastics, and preferably of appropriate plastic.

The support structure, typically metallic, comprises caps at each end of the filter vessel held together by tie rods. The bottom cap has openings for inlet and outlet access. The upper end cap has a central opening for a pressure release valve and pressure gauge communicating with the upper chamber. The upper end cap and an adjacent upper plate are arranged so that the end cap and upper plate can be readily removed to expose the interior of the pressure vessel for easy filter cartridge changing. Elongated bolts at the bottom of the vessel serve as legs.

Fluid pressure sealing for the annular separation chamber is provided by O-ring seals mounted in the flanges of the flow block, thereby defining in addition to the annular chamber, the upper chamber, and provide sealing between the input upper filter chamber and the separation chamber, together with a seal at the lower end portion of the pressure vessel.

Generally horizontal passages are provided for connection with the apertures in the upper portion of the flow block for communication between the respective apertures and the annular separation chamber. A large diameter passage or opening in the flow block communicates with the annular chamber and serves as a collection area between the annular chamber and the outlet connection.

The path of fluid flow through the pressure vessel is from the inlet, through a vertical passage in the seat plate to the upper chamber above the seat plate or flow block, then through the filter cartridges or elements, then via the passages defined in the plate or flow block to the collection or separation chamber defined by the annular chamber or channel, wherein the filtered fluid is completely isolated from the dirty unfiltered liquid by the seal at the upper side of the separation chamber. From the separation or collection chamber the fluid passes outwardly through openings to exit the filter vessel.

Through use of the seat plate or solid integral flow block separating the upper chamber from the collection chamber following filtration, the filter structure of the present invention will withstand high pressures of the order of 150 psi with a safety factor of 6, as contrasted to present filter devices which will withstand 100 psi or less, but with a safety factor, e.g. of only 1½.

The invention structure thus provides as an essential feature a rugged heavy construction of the flow block in the form of a simplified unitary structure readily fabricated in a single "cut" by a machine, instead of requiring the fabrication of multiple components as in the prior art.

With the structure of the present invention, the pressure in the upper chamber with the cartridge filter elements is substantially equal to that in the lower chamber, defined by the "O" rings and the annular chamber. The structure allows the inlet connection and outlet connection to be placed so that pressure differentials are of little consequence at elevated use and test pressures of say 150 to 900 psi. The structure can be totally supported by rugged high strength materials and hence there is no tendency of the peripheral or edge portions of the seat portions of the flow block to buckle or distort and cause leakage. With prior art filter vessels constructed of primarily plastic materials, there can develop substantial pressure differentials between the internal portions of the filter vessel and the external portions of the filter vessel at the ends and at the inlet and outlet connections, which cannot or have not been supported, thereby causing the filter vessel to rupture and leak at greater than 100-150 psi maximum.

BRIEF DESCRIPTION OF THE DRAWINGS

FIG. 5 is another section taken on line 5—5 of FIG. 2;

FIG. 8 is a horizontal section taken on line 8—8 of FIG. 6, looking upwardly in the direction of the arrows; and FIG. 9 is a horizontal section taken on line 9—9 of FIG. 6, looking downwardly in the direction of the arrows.

DESCRIPTION OF THE PREFERRED EMBODIMENT

Figure 1:
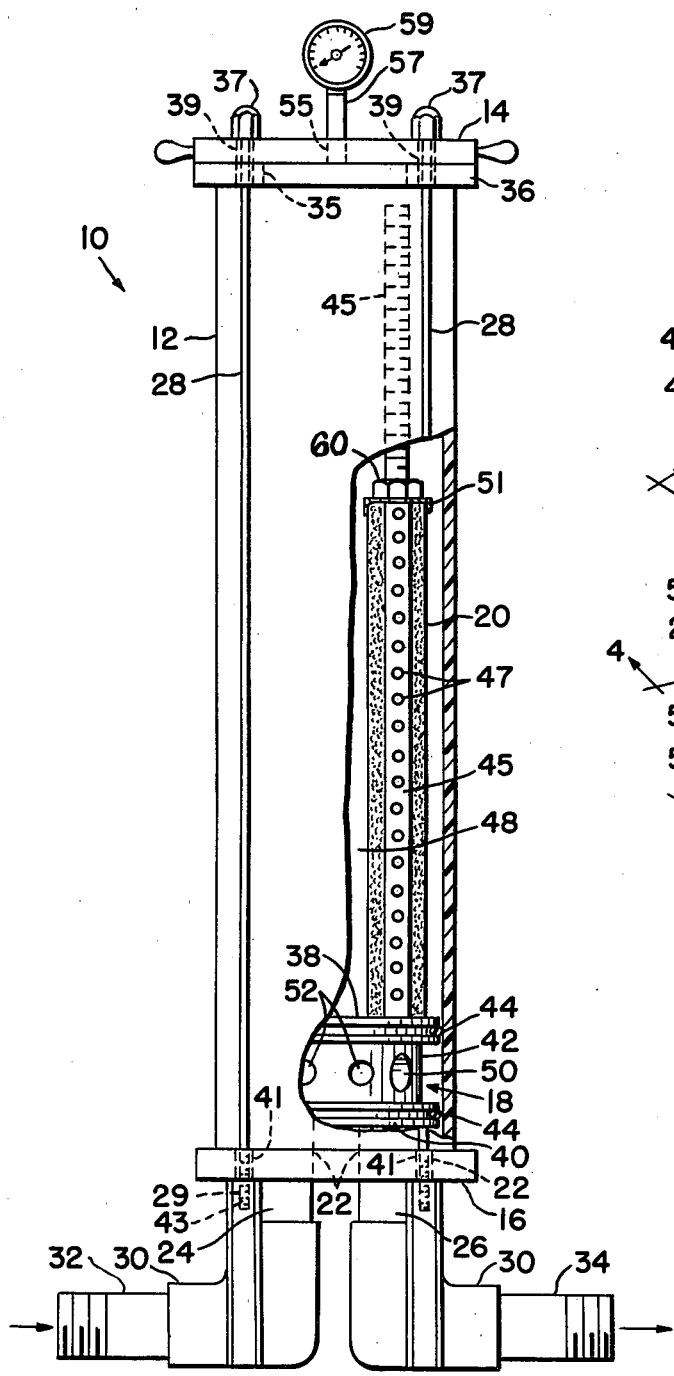
FIG. 1 is an elevational view of the pressure vessel of the invention, partly broken away to show certain details.

Referring to FIGS. 1 to 5 of the drawing, a pressure vessel 10 comprises a cylindrical wall 12, preferably in the form of a fiber reinforced plastic cylinder, an end cap 14 at the top of the vessel, also preferably of plastic, and a lower end cap 16, similarly preferably of plastic. In the lower portion of the pressure vessel is positioned a seat plate or flow block structure 18. A plurality of filter cartridges 20 are mounted on the flow block 18.

Bottom plate or end cap 16 has two large diameter holes 22 for receiving an inlet pipe 24 and an outlet pipe 26, and a support structure is provided comprised of tie rods 28 which are connected by threaded engagement at 29 to large elongated bolts 30 at the bottom of the vessel which serve as legs. The legs support the vessel off the ground sufficiently to allow inlet and outlet connections 32 and 34 to appropriate plumbing.

The upper end cap 14 is mounted on an upper plate 36 having a large central opening 35 therein, by bolts 37. The tie rods 28 each pass through holes 39 and 41 in caps 14 and 16, respectively, the tie rods being threadedly received at 43 in head plate 16. Removal of bolts 37 permits removal of end cap 14 which can then be lifted over the tie rods 28, thus exposing the interior of the pressure vessel through the large central opening 35 in head plate 36, for easy changing of the filter cartridges 20, if necessary, while the remainder of the vessel remains assembled. Each filter cartridge 20 is tubular and is mounted about a pipe 45 having holes 47 therein to receive fluid passing through the filter cartridges 20. The lower ends of pipe 45 are threaded into the threaded openings 23 (see FIG. 5) in the upper portion of flow block 18, for passage of fluid from pipes 45 through the apertures 23. A nut 60 (FIG. 1) having a circular knife edge 51 is threaded onto pipes 45 and extends into the top portion of the filter material of the cartridge 20 to hold the cartridge in position.

The unitary flow block 18 has an upper plate portion 38, a lower plate portion 40, and a central portion 42. The plate portions 38, 40 include heavy flanges extending radially beyond the periphery of the reduced central portion 42. This flow block or lower separation chamberseat plate combination can be fabricated of any of various materials including plastics. O-ring seals 44 are positioned in peripheral grooves 49 in flanges 38 and 40. The flow block is mounted in the lower portion of the pressure vessel 10 with the seals 44 providing positive sealing between the inner wall surface of the cylinder 12 and the flow block, thereby defining an annular chamber 46, which is a collection chamber for clean fluid after passage through the filter cartridges. The flow block 18 upper flange seal provides pressure sealing between the input or upper filter chamber 48 and the collection chamber 46. End cap 14 has a central threaded opening 55 for attachment of a pressure release valve 57 and a pressure gauge 59.

The small apertures 23 are counterbored at 25 to receive the end portions of filter cartridges 20. Openings 52 extend at right angles to respective apertures 23 and communicate between these apertures and annular chamber 46.

A large diameter passage or opening 50 is provided between annular chamber 46 and a large diameter opening which extends vertically from the lower portion of the flow block 18, and serves as or defines a collection space between the annular collection chamber 46 and the outlet connection 30 of the pressure vessel. An inlet passage 53 extends through the flow block 18, and a vertically extending pipe 58 is threadedly secured in a threaded end portion of the passage for communication with inlet 32.

Figure 2:
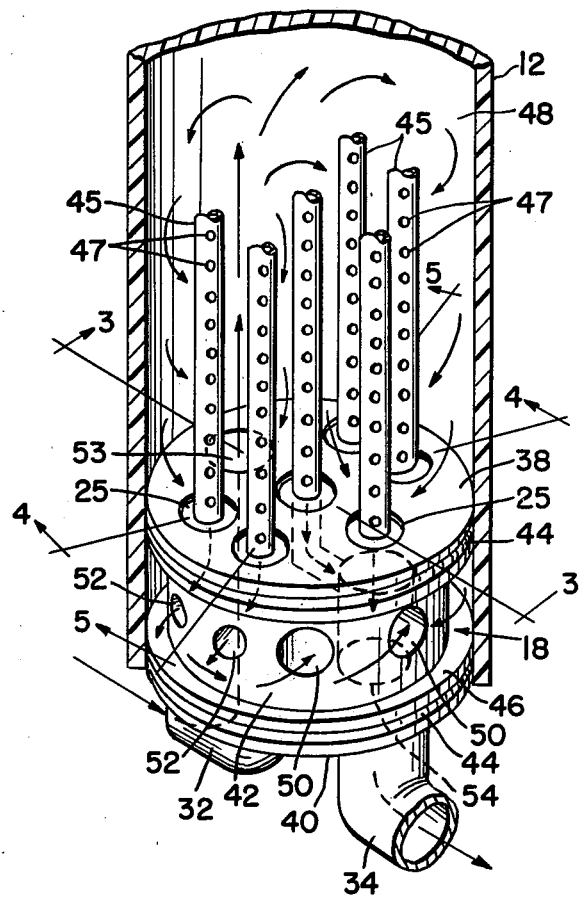
FIG. 2 is a perspective elevational view shown partly in section.
Figure 3:
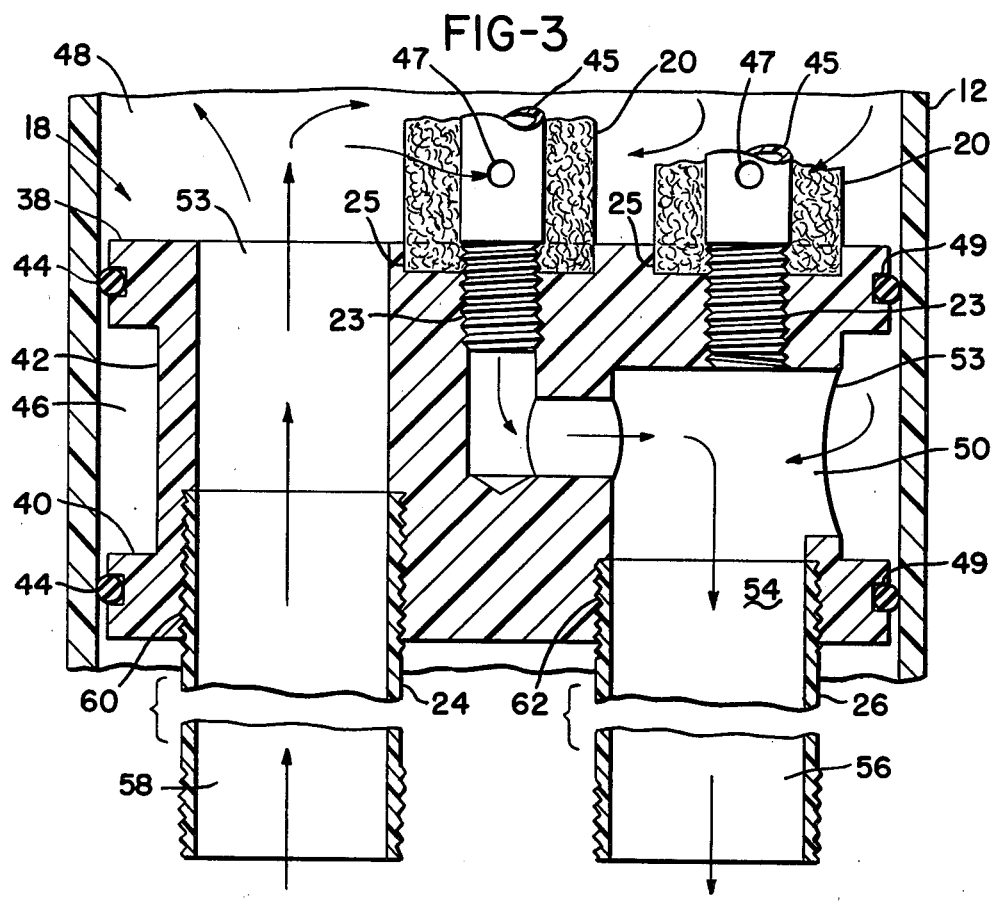
FIG. 3 is a section taken on line 3—3 through the flow block structure of FIG. 2.
Figure 4:
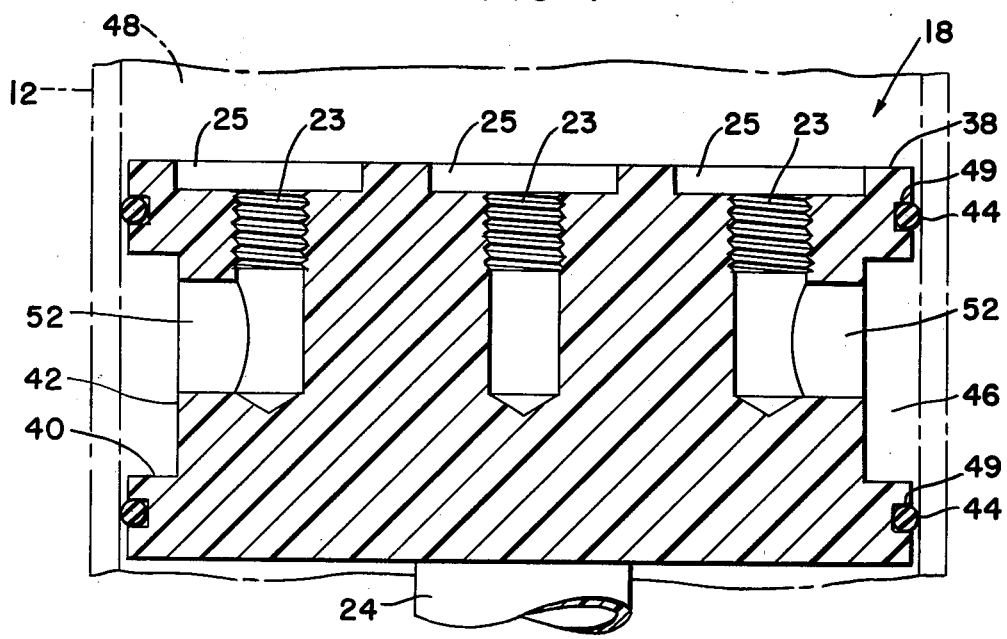
FIG. 4 is a section taken on line 4—4 of the flow block structure of FIG. 2.

Referring to FIG. 2, fluid flow through the filter vessel is through inlet 32, pipe 58, the upper portion of passage 53, and thence into upper filter chamber 48. The fluid then flows inwardly through the filter cartridges, through the openings in pipes 45, downwardly through pipes 45, through apertures 23 in upper portion 38 of the flow block, and thence via passages 52 through annular chamber 46, then through large diameter passages 50. The fluid then flows into collection space 56 defined by the sleeve threadedly secured at 62 in opening 54 in the flow block, and thence to outlet connection 34.

Clean filtered liquid is completely isolated from unfiltered or dirty input liquid in filter chamber 48 by the O-ring seal 44 on the upper flange of the flow block, and by filter cartridges 20.

Figure 6:
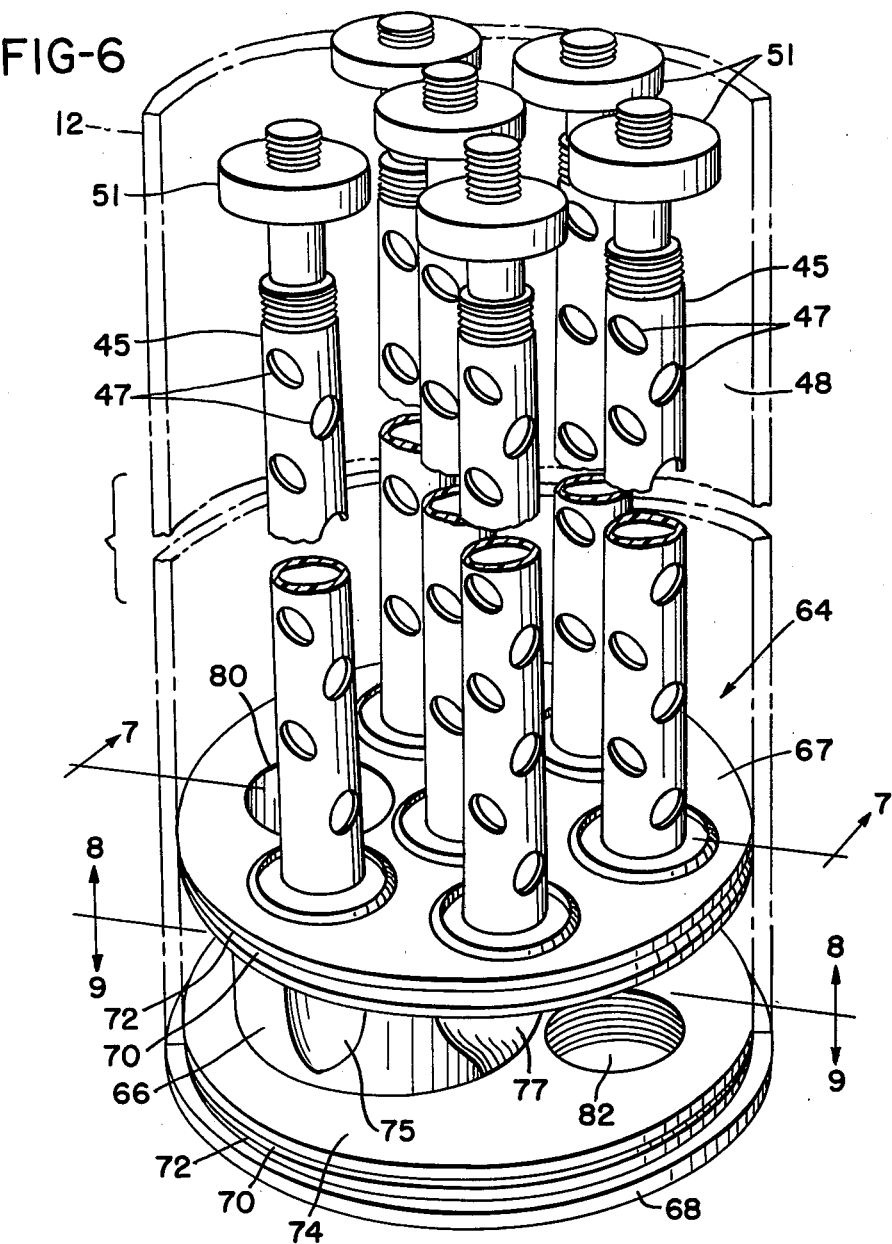
FIG. 6 is a perspective elevational view of a modification of the device of FIG. 1.
Figure 7:
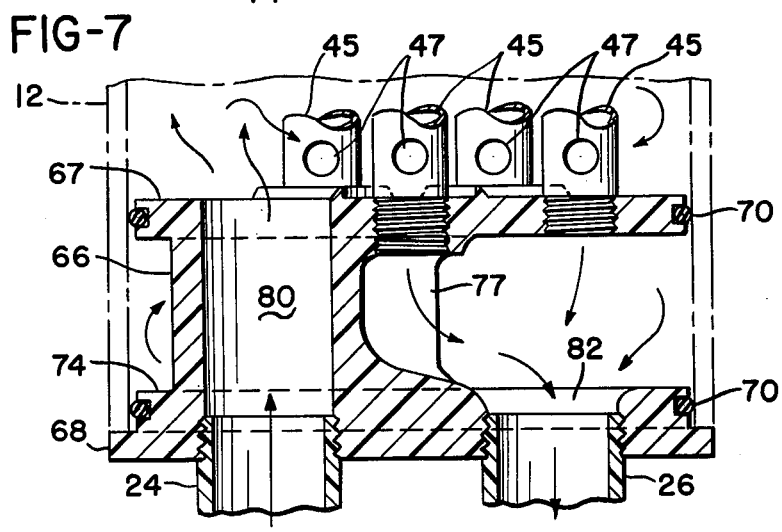
FIG. 7 is a vertical section taken on line 7—7 through the modified form of FIG. 6.

FIGS. 6 and 7 illustrate a modified form of pressure filter according to the invention, which substantially reduces any fluid pressure drop through the flow block resulting from turbulence caused by outflow from passages 52 meeting outflow through annular chamber 46. Flow block 64 has a reduced central or body portion 66, an upper plate 67 and a lower plate 68. Central portion 66 is substantially smaller in diameter than plates 67 and 68, and its axis is substantially offset from the axis of plate 67, 68. O-ring seals 70 in peripheral grooves 72 of flange portions of plates 67 and 68, serve the same purpose as seals 44 in the embodiment of FIG. 1, seals 44 engaging the inner wall of the cylindrical housing to form or define an annular chamber 74 between wall 12 of the housing and central portion 66 of the flow block. Chamber 74 is substantially larger than the corresponding chamber 76 of the embodiment of FIG. 1.

As shown in FIGS. 8 and 9, the flow block central portion 64 has recessed oppositely disposed portions 75, thus to permit flow from two of the pipes 45, about which filter cartridges are mounted, directly into annular chamber 74. The central portion 66 is more deeply recessed at 77 between the recesses 75, thus to permit flow directly from another of the pipes 45 directly into chamber 74. Other pipes 45 communicate directly with annular chamber 74.

Referring to FIG. 6, fluid flow is upwardly through inlet passage 80 through the flow block and into upper chamber 48, thence through the filter cartridges on pipes 45 and through openings 47 in the pipes. Fluid flows directly from the pipes into annular chamber 74, and from chamber 74 the flow is outwardly through the large passage 82 in the lower portion of the flow block.

The horizontal passages such as 52 communicating with the annular chamber 46 in the flow block 18 of the modification of FIGS. 1 to 5 being eliminated in the modified form of FIG. 6, the turbulence within and the fluid pressure drop across, the flow block 64 of FIG. 6, are substantially reduced, as compared to the embodiment of FIGS. 1 to 5.

It is accordingly seen that the invention provides a high pressure filter apparatus which contains as an essential feature a flow block structure as an integral member and which has an outer annular channel which with the filter housing wall defines a separation or collection chamber, which separates the "dirty" input material passing into the upper chamber of the device, from clean filtered material. Sealing means provide positive sealing of the annular collection or separation chamber from the upper chamber containing input material.

Typical applicatins for the filter according to the invention are pre-filtration in sea water to fresh water conversion by reverse osmosis; filtration of potassium persulfate or sodium persulfate photographic bleach solutions, filtration of acidic solutions and filtration of numerous chemicals which cause loss due to corrosion of metallic surfaces with which they come in contact in processes requiring filtration in chemical, petroleum and other industrial application where high pressure filtration and transfer are required.

The pressure vessel due to its unique configuration of high pressure fiberglass reinforced plastic pipe and flow block structure can withstand all of the design and test criteria required particularly for fiberglass reinforced pressure vessels.

While I have described particular embodiments of my invention for the purpose of illustration within the spirit of the invention, it will be understood that the invention is not to be taken as limited except by the scope of the appended claims.

The inventor claims:
1. A pressure filter vessel comprising:
   a cylindrical housing,
   an end cap at each end of the housing,
   a flow block in the lower end portion of said vessel and having a reduced central portion and upper and lower flanges,
   sealing means on each of said flanges to provide fluid pressure sealing between said cylindrical housing and each of the flanges, said flanges cooperating with the cylindrical housing and flow block reduced portion to define an annular chamber, said upper flange cooperating with the cylindrical housing and the upper end cap to define an upper chamber,
   an inlet means connected with the flow block for fluid flow through an opening in the flow block to the upper chamber,
   at least one filter cartridge mounted in an aperture in the flow block and extending into the upper chamber,
   said flow block defining passage means communicating between said aperture and the annular chamber, and
   outlet means for fluid flow from the annular chamber.
2. A pressure filter vessel according to claim 1, wherein:
   said flow block has upper and lower plate portions from which said upper and lower flanges extend radially outwardly, and said flow block central portion has a cylindrical wall between said flanges, said central portion cylindrical wall and the inner wall of the cylindrical housing cooperating with the flanges to define the annular chamber,
   the pressure filter vessel further including means defining a first passage through the flow block communicating between the inlet connection and the upper chamber,
   said flow block defining a plurality of apertures in its upper portion, a plurality of passages communicating between said apertures and the annular chamber, and
   an outlet opening communicating between said annular chamber and the outlet means, and means for mounting a plurality of filter cartridges in said flow block apertures.
3. The pressure vessel according to claim 1, and further including:
   a plurality of tie rods connected at opposite ends thereof to said end caps to maintain said pressure vessel in assembled condition, said upper end plate being removable to provide access to said upper chamber.
4. The pressure vessel of claim 1, wherein:
   said flanges contain grooves, said sealing means comprise "O" ring seals positioned in said grooves, and said "O" rings are in contact with the inner wall of said cylindrical housing.
5. The pressure vessel as defined in claim 1, wherein:
   said cylindrical housing is a fiber reinforced plastic cylinder, said end caps being plastic end caps.
6. The pressure vessel as defined in claim 3, and further including:
   a pair of members at the bottom of said pressure vessel, the lower ends of said tie rods being connected to said members and forming legs for supporting said pressure vessel, said inlet and outlet means including inlet and outlet connections, said inlet and outlet connections being positioned at the lower end of said vessel adjacent to said legs.
7. The pressure vessel as defined in claim 6, and further including:
   a central pipe for each cartridge, and
   a nut having a lower knife edge mounted on each of said central pipes and adapted to be screwed down for engagement of said knife edge with the filter element.
8. The pressure vessel according to claim 3, and further including:
   a plurality of tie rods,
   a pair of bolts at the bottom of said pressure vessel, the lower ends of said tie rods being threadedly connected to said bolts and forming legs for supporting said pressure vessel,
   a head plate positioned in contact with and below the upper end cap at one end of said vessel, said head plate having a large central opening therein, said tie rods being threadedly connected to said head plate and extending through openings in the opposite end caps, and
   bolts connected to the upper end of said tie rods, whereby the removal of said bolts from the upper end cap provides access to the interior of the pressure vessel through said large central opening in said head plate while maintaining the remainder of the filter vessel in position.
9. A pressure vessel according to claim 2, wherein:
   said means for mounting each of said filter cartridges in said apertures comprises a central pipe having holes therein, said filter cartridges each being mounted on one of said central pipes, said central pipes each being threadedly secured in one of said apertures in the upper portion of said flow block, and said pressure vessel further including a nut mounted on each of said central pipes and having a circular knife edge at its lower end, said nuts being adapted to be turned down on each of said filter cartridges, with said circular knife edge engaging with the upper end thereof.

10. A pressure filter vessel comprising:

an outer cylindrical housing, an end cap at each end of the cylindrical housing, elongated tie rods interconnecting said end caps, a flow block in the lower portion of the cylindrical housing, said flow block having a reduced central portion and upper and lower plate portions defining upper and lower flanges, an "O" ring seal disposed in a peripheral groove in each of said flanges and engaging the inner wall of the cylindrical housing to provide pressure sealing, said flow block upper flange cooperating with the cylindrical housing and upper end cap to define an upper chamber, said upper and low flow block flanges and said seals cooperating with the flow block central portion and the inner wall of the cylindrical housing to define an annular collection chamber, inlet means in the lower portion of the cylindrical housing, said flow block defining a vertical passage communicating with said inlet means and said upper chamber, said flow block defining a plurality of additional apertures in its upper plate portion, a tubular filter cartridge mounted in each of said additional apertures, said flow block defining a plurality of passages generally normal to said flow block upper portion apertures for communication between said apertures and said annular collection chamber, at least one relatively large diameter passage defined by said flow block in communication with the annular chamber and serving as a collection space for fluid from said annular collection chamber, and an outlet connection communicating with said relatively large diameter passage.

11. A pressure filter vessel comprising:

an outer cylindrical housing, an end cap at each end of the cylindrical housing, elongated tie rods interconnecting said end caps, a flow block in the lower portion of said cylindrical housing, said flow block having a reduced central portion and upper and lower circular plate portions defining upper and lower flanges, the axis of said reduced central portion being offset from the axis of said plate portions, an O-ring seal disposed in a peripheral groove in each of said flanges and engaging the inner wall of said cylindrical housing to provide pressure sealing, said flow block upper flange cooperating with the cylindrical housing and upper end cap to define an upper chamber, said upper and lower flow block flanges and the seals thereon cooperating with the flow block reduced portion and the inner wall of the cylindrical housing to define an annular collection chamber, inlet means in the lower portion of said cylindrical housing, said flow block defining a vertical passage communicating with said inlet means and said upper chamber, said flow block defining a plurality of additional apertures in its upper plate portion, an apertured pipe mounted in each of said additional apertures, a tubular filter cartridge mounted on each of said pipes, said pipes communicating directly with the annular chamber, a relatively large diameter opening in the lower circular plate portion in communication with said annular chamber, and an outlet connection connected to and communicating with said large diameter hole in said lower plate portion.

12. A pressure filter vessel as defined in claim 11, wherein:

said flow block has recesses therein to permit at least some of said pipes to communicate directly with said annular chamber via said recesses.

* * * * *